US009459857B2

(12) United States Patent
Gerhart et al.

(10) Patent No.: US 9,459,857 B2
(45) Date of Patent: Oct. 4, 2016

(54) MANAGING WEAR OF SYSTEM AREAS OF STORAGE DEVICES

(71) Applicant: HGST Netherlands B.V., Amsterdam (NL)

(72) Inventors: Darin E. Gerhart, Oronoco, MN (US); Cory Lappi, Rochester, MN (US); Phillip Peterson, Rochester, MN (US); William J. Walker, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/602,124

(22) Filed: Jan. 21, 2015

(65) Prior Publication Data

US 2016/0210132 A1    Jul. 21, 2016

(51) Int. Cl.
*G06F 9/45* (2006.01)
*G06F 9/445* (2006.01)
*G06F 9/44* (2006.01)

(52) U.S. Cl.
CPC .. *G06F 8/65* (2013.01); *G06F 8/71* (2013.01)

(58) Field of Classification Search
CPC ............... G06F 8/61; G06F 8/71; G06F 8/65
See application file for complete search history.

(56) References Cited

U.S. PATENT DOCUMENTS

| 5,452,339 | A  | * | 9/1995  | Siu ........................... G06F 8/71 379/15.03 |
| 6,631,520 | B1 | * | 10/2003 | Theron ...................... G06F 8/65 712/E9.007 |
| 7,873,885 | B1 |   | 1/2011  | Shin et al. |
| 8,219,794 | B1 |   | 7/2012  | Wang et al. |
| 8,694,984 | B2 |   | 4/2014  | Chang |
| 9,092,296 | B1 | * | 7/2015  | Nay ........................... G06F 8/65 |
| 2003/0177223 | A1 | * | 9/2003 | Erickson ................... G06F 8/71 709/224 |

(Continued)

FOREIGN PATENT DOCUMENTS

| WO | 2009110140 A1 | 9/2009 |
| WO | 2012170521 A2 | 12/2012 |

OTHER PUBLICATIONS

Yajin Zhou et al., "Dissecting Android Malware: Characterization and Evolution", [Online], IEEE 2012, pp. 95-109, [Retrieved from Internet on Jun. 8, 2016], <http://ieeexplore.ieee.org/stamp/stamp.jsp?arnumber=6234407>.*

(Continued)

*Primary Examiner* — Thuy Dao
*Assistant Examiner* — Ziaul A Chowdhury
(74) *Attorney, Agent, or Firm* — Shumaker & Sieffert, P.A.

(57) ABSTRACT

Techniques are described for managing firmware versions for a storage device. In one example, a storage device includes a memory and a controller. The controller is configured to execute a first version of a firmware, receive information for a second version of a firmware that is different from the first version, determine, based on the information for the second version of the firmware, whether the version of the second version of the firmware is stored in a system area of the memory, responsive to determining that the second version of the firmware is stored in the system area, load the second version of the firmware, responsive to determining that the second version of the firmware is not stored in the system area, store the second version of the firmware in the system area, update an active firmware index, and execute the second version of the firmware.

18 Claims, 4 Drawing Sheets

(56) References Cited

U.S. PATENT DOCUMENTS

| | | | |
|---|---|---|---|
| 2005/0086654 A1* | 4/2005 | Sumi | G06F 8/65 717/171 |
| 2007/0226448 A1* | 9/2007 | Hirayama | G06F 8/65 711/170 |
| 2008/0120610 A1* | 5/2008 | Katano | G06F 8/65 717/168 |
| 2009/0228697 A1* | 9/2009 | Kurashige | G06F 8/65 713/100 |
| 2011/0196667 A1* | 8/2011 | Sasaki | G06F 8/65 704/8 |
| 2013/0124932 A1 | 5/2013 | Schuh et al. | |
| 2013/0304962 A1 | 11/2013 | Yin et al. | |
| 2014/0223424 A1* | 8/2014 | Han | G06F 8/665 717/173 |
| 2015/0169313 A1* | 6/2015 | Katsura | G06F 11/00 717/170 |
| 2015/0199190 A1* | 7/2015 | Spangler | G06F 8/665 713/2 |
| 2015/0347124 A1* | 12/2015 | Sotani | G06F 8/665 717/170 |
| 2016/0048389 A1* | 2/2016 | Paulraj | G06F 9/44536 717/170 |

OTHER PUBLICATIONS

M. Bernaschi et al. "Access points vulnerabilities to DoS attacks in 802.11 networks", [Online], 2008, pp. 159-169, [Retrieved from Internet on Jun. 8, 2016], <http://download.springer.com/static/pdf/232/art%253A10.1007%0252Fs11276-006-8870-6.pdf>.*

S. Brown, "Updating Software in Wireless Sensor Networks: A Survey", [Online], 2006, pp. 1-14, [Retrieved from Internet on Jun. 8, 2016], <http://citeseerx.ist.psu.edu/viewdoc/download?doi=10.1.1.100.4510&rep=rep1&type=pdf>.*

Muhammad Sabir Idrees et al., "Secure Automotive On-Board Protocols: A Case of Over-the-Air Firmware Updates", [Online], 2011, pp. 1-14, [Retrieved from Internet on Jun. 8, 2016], <http://www.eurecom.fr/en/publication/3364/download/rs-publi-3364_1.pdf>.*

* cited by examiner

MANAGING WEAR OF SYSTEM AREAS OF STORAGE DEVICES

TECHNICAL FIELD

This disclosure relates to storage devices and, more specifically, to managing wear of system areas of storage devices.

BACKGROUND

Memory devices used in computers or other electronics devices may be non-volatile memory or volatile memory. The main difference between non-volatile memory and volatile memory is that non-volatile memory may continue to store data without requiring a persistent power supply. As a result, non-volatile memory devices have developed into a popular type of memory for a wide range of electronic applications. For instance, non-volatile memory devices, including flash memory devices, may be incorporated into solid-state storage devices, such as solid-state drives (SSDs). Flash memory has a finite number of erase-write cycles before data retention can no longer be guaranteed.

SSDs may separate the non-volatile memory devices into a system area that stores firmware for controlling operation of the SSD and a data area that stores other information, including user information. As the system area may endure fewer erase-write cycles over the life of the SSD, SSD controllers may not apply wear-leveling techniques to the system area, which may result in a reduced life span at least a portion of the system area memory as compared to the data area memory.

SUMMARY

In one example, a method includes executing, by a controller of a storage device, a first version of a firmware for the storage device, receiving, by the controller, information for a second version of a firmware for the storage device that is different from the first version of the firmware, and determining, by the controller and based on the information for the second version of the firmware, whether a copy of the version of the second version of the firmware is already stored in a system area of the storage device. The method may also include, responsive to determining that the second version of the firmware for the storage device is already stored in the system area, loading, by the controller, the second version of the firmware from the system area, responsive to determining that the second version of the firmware for the storage device is not stored in the system area, storing, by the controller, the second version of the firmware in the system area, updating, by the controller, an active firmware index to indicate that the second version of the firmware is an active version of the firmware, and executing, by the controller, the second version of the firmware.

In another example, a storage device includes a memory, and a controller. The control is configured to: execute a first version of a firmware for the storage device, receive information for a second version of a firmware for the storage device that is different from the first version of the firmware, determine, based on the information for the second version of the firmware, whether a copy of the version of the second version of the firmware is already stored in a system area of the memory, responsive to determining that the second version of the firmware for the storage device is already stored in the system area, load the second version of the firmware from the system area, responsive to determining that the second version of the firmware for the storage device is not stored in the system area, store the second version of the firmware in the system area of the memory, update an active firmware index to indicate that the second version of the firmware is an active version of the firmware, and execute the second version of the firmware.

In another example, a non-transitory computer-readable storage medium having stored thereon instructions that, when executed, cause one or more processors of a storage device to execute a first version of a firmware for the storage device, receive information for a second version of a firmware for the storage device that is different from the first version of the firmware, and determine, based on the information for the second version of the firmware, whether a copy of the version of the second version of the firmware is already stored in a system area of the storage device. The instruction may further cause the one or more processors to, responsive to determining that the second version of the firmware for the storage device is already stored in the system area, load the second version of the firmware from the system area, responsive to determining that the second version of the firmware for the storage device is not stored in the system area, store the second version of the firmware in the system area, update an active firmware index to indicate that the second version of the firmware is an active version of the firmware, and execute the second version of the firmware.

In another example, a system includes means for executing a first version of a firmware for a storage device, means for receiving information for a second version of a firmware for the storage device that is different from the first version of the firmware, and means for determining, based on the information for the second version of the firmware, whether a copy of the version of the second version of the firmware is already stored in a system area of the storage device. The system may also include means for, responsive to determining that the second version of the firmware for the storage device is already stored in the system area, loading the second version of the firmware from the system area, means for, responsive to determining that the second version of the firmware for the storage device is not stored in the system area, storing the second version of the firmware in the system area, means for updating an active firmware index to indicate that the second version of the firmware is an active version of the firmware, and means for executing the second version of the firmware.

The details of the one or more examples discussed above are set forth in the accompanying drawings and the description below. Other features, objects, and advantages will be apparent from the description and drawings, and from the claims.

DETAILED DESCRIPTION

The disclosure describes techniques for managing firmware versions for a storage device. Most specifically, the techniques may enable an SSD to store multiple firmware versions in a system memory area of the SSD and selectively load the multiple firmware versions. During testing of an SSD, many different firmware versions may be installed on the SSD, which may cause the system area to wear prematurely and may negatively impact the operational lifespan of the SSD. In some SSDs, each time a different firmware version is installed, the SSD downloads the full firmware, erases the system area, and writes the downloaded firmware to the system area. In accordance with techniques of this disclosure, an SSD may store multiple firmware versions in the system area. The SSD may receive an indication of a particular firmware version stored in the system area and load the indicated version of the firmware from the system area. In this way, the SSD may more quickly and reliably install a different firmware version and reduce wear to the system area.

Figure 1:
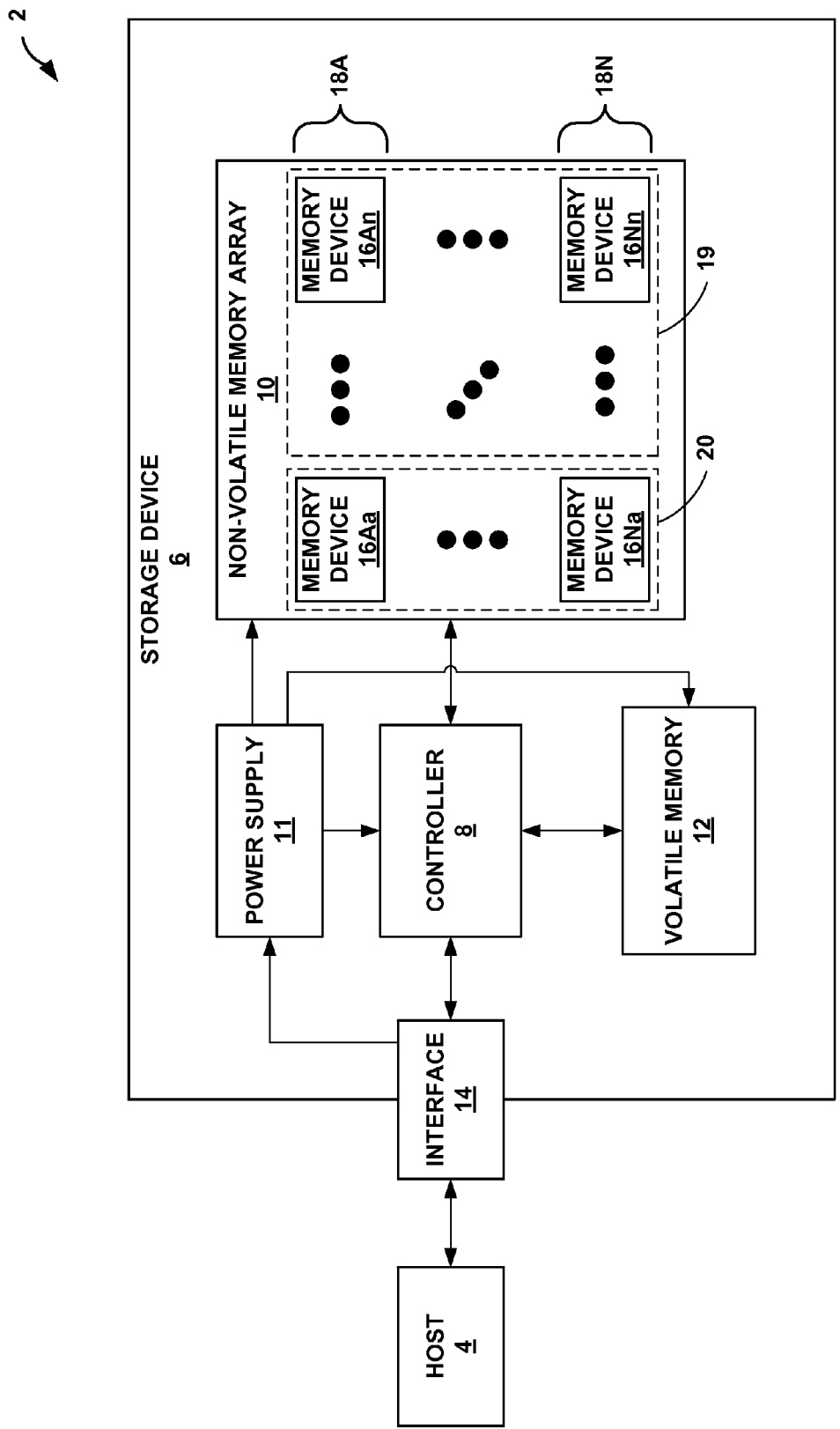
FIG. 1 is a conceptual and schematic block diagram illustrating an example storage environment in which a storage device may function as a storage device for a host device, in accordance with one or more techniques of this disclosure.

FIG. 1 is a conceptual and schematic block diagram illustrating an example storage environment in which a storage device 6 may function as a storage device for a host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, that may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1 storage device 6 may include controller 8, non-volatile memory array 10 (NVMA 10), power supply 11, volatile memory 12, and interface 14. In some examples, storage device 6 may include additional components not shown in FIG. 1 for the sake of clarity. For example, storage device 6 may include a printed circuit board (PCB) to which components of storage device 6 are mechanically attached and which includes electrically conductive traces that electrically interconnect components of storage device 6; and the like. In some examples, the physical dimensions and connector configurations of storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, storage device 6 may be directly coupled (e.g., directly soldered) to a motherboard of host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 6 may include volatile memory 12, which may be used by controller 8 to store information. In some examples, controller 8 may use volatile memory 12 as a cache. For instance, controller 8 may store cached information in volatile memory 12. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel Arbitrated Loop (FCAL), small computer system interface (SCSI), serially attached SCSI (SAS), peripheral component interconnect (PCI), and PCI-express. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. As illustrated in FIG. 1, power supply 11 may receive power from host device 4 via interface 14.

Storage device 6 may include NVMA 10 which may include a plurality of memory devices 16Aa-16Nn (collectively, "memory devices 16") which may each be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 6 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples, of memory devices 16 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Controller 6 may write data to and read data from NAND flash memory devices at the page level and erase data from NAND flash memory devices at the block level.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16An may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

In some examples, storage device 6 may include a number of memory devices 16 selected to provide a total capacity that is greater than the capacity accessible to host device 4. This is referred to as over-provisioning. For example, if storage device 6 is advertised to include 240 GB of user-accessible storage capacity, storage device 6 may include sufficient memory devices 16 to give a total storage capacity of 256 GB. The 16 GB of storage devices 16 may not be accessible to host device 4 or a user of host device 4. Instead, the additional storage devices 16 may provide additional blocks to facilitate writes, garbage collection, wear leveling, and the like. Further, the additional storage devices 16 may provide additional blocks that may be used if some blocks wear to become unusable and are retired from use. The presence of the additional blocks may allow retiring of the worn blocks without causing a change in the storage capacity available to host device 4. In some examples, the amount of over-provisioning may be defined as $p=(T-D)/D$, wherein p is the over-provisioning ratio, T is the total storage capacity of storage device 2, and D is the storage capacity of storage device 2 that is accessible to host device 4.

As shown in FIG. 1, NVMA 10 is logically divided into data area 19 and system area 20. While system area 20 is shown as including memory devices 16Aa-16Na, system area 20 may include any number of memory devices 16 or may only include a portion of a single memory device 16. Similarly, data area 19 may include any number of memory devices 16, including portions of one or more memory device 16. Controller 8 is configured to store data received from host 4 within data area 19 and system data within system area 20. For example, controller 8 may store an operating system of host 4, user data, application data, etc. within data area 19 and may store firmware data within system area 20. In some implementations, controller 8 is not configured to perform wear leveling or other memory device and data management techniques on data stored within system area 20 as such techniques reduce the read and write performance of system area 20.

Controller 8 executes program code to manage the storage of data to and retrieval of data from NVMA 10. This program code may be referred to as "firmware" and may be occasionally updated to enhance performance of storage device 6, fix bugs in the program code, provide additional functionality, etc. To update the firmware of storage device 6, host 4 may send an instruction to update the firmware and an updated version of the firmware. Controller 8 may be configured to download the updated version of the firmware from host 4, erase the portion of system area 20 at which the current version of the firmware is stored, store the updated version of the firmware, and execute the updated version of the firmware. However, as each write-erase cycle applies a high voltage to the transistors within the memory devices 16 that are included within system area 20, repeatedly changing the version of the firmware executed by controller 8 may prematurely wear out the memory devices 16 of system area 20, reducing the lifespan of storage device 6.

In accordance with techniques of this disclosure, controller 8 may be configured to manage multiple different firmware versions for storage device 6. Controller 8 may store two or more different firmware versions within system area 20 and may manage the storage, loading, and retention of the different firmware versions. For example, rather than storing the desired firmware version each time the firmware changes, controller 8 may be configured to determine whether the desired firmware version is currently stored within system area 20. If the desired firmware version is currently stored within system area 20, controller 8 may skip storing the firmware downloaded from host 4. If the desired firmware version is not currently stored in system area 20, controller 8 may store the desired firmware within system area 20. In either instance, after receiving a command to change the currently executing firmware, controller 8 updates an active firmware index and executes the desired version of the firmware. The active firmware index indicates which version of the firmware should be loaded following a power cycle of storage device. By storing multiple version of firmware within system area 20 and only storing new firmware versions from host 4 when the firmware is not already stored within system area 20, the controller 8 may more quickly and reliably install a different firmware version and reduce wear to system area 20.

Figure 2:
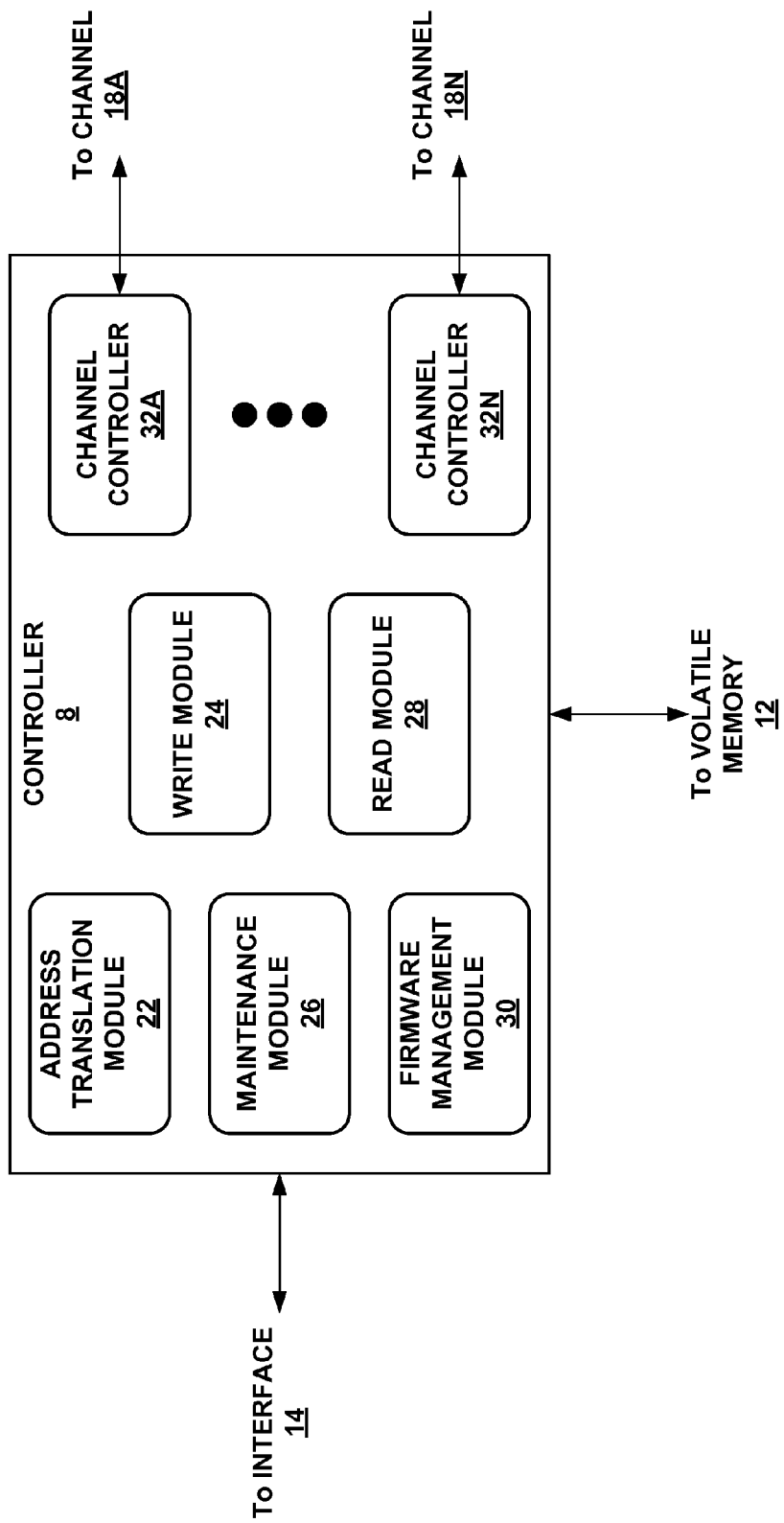
FIG. 2 is a conceptual and schematic block diagram illustrating an example controller, in accordance with one or more techniques of this disclosure.

FIG. 2 is a conceptual and schematic block diagram illustrating an example controller 8, in accordance with one or more techniques of this disclosure. In some examples, controller 8 may include address translation module 22, write module 24, maintenance module 26, read module 28, firmware management module 30, and a plurality of channel controllers 32A-32N (collectively, "channel controllers 32"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with the host device 4 via interface 14 and manage the storage of data to and the retrieval of data from memory devices 16. For example, write module 24 of controller 8 may manage writes to memory devices 16. For example, write module 24 may receive a message from host device 4 via interface 14 instructing storage device 6 to store data associated with a logical address and the data. Write module 24 may manage writing of the data to memory devices 16.

For example, write module 24 may communicate with address translation module 22, which manages translation between logical addresses used by host device 4 to manage storage locations of data and physical block addresses used by write module 24 to direct writing of data to memory devices. Address translation module 22 of controller 8 may utilize a flash translation layer or table that translates logical addresses (or logical block addresses) of data stored by memory devices 16 to physical block addresses of data stored by memory devices 16. For example, host device 4 may utilize the logical block addresses of the data stored by memory devices 16 in instructions or messages to storage device 6, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, address translation module 22 may store the flash translation layer or table in volatile memory 12.

In this way, host device 4 may be allowed to use a static logical block address for a certain set of data, while the physical block address at which the data is actually stored may change. Address translation module 22 may maintain the flash translation layer or table to map the logical block addresses to physical block addresses to allow use of the static logical block address by the host device 4 while the physical block address of the data may change, e.g., due to wear leveling, garbage collection, or the like.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 22 to update the flash translation layer or table based on the selected blocks. For instance, write module 24 may receive a message from host device 4 that includes a unit of data and a logical block address, select a block within a particular memory device of memory devices 16 to store the data, cause the particular memory device of memory devices 16 to actually store the data (e.g., via a channel controller of channel controllers 32 that corresponds to the particular memory device), and cause address translation module 22 to update the flash translation layer or table to indicate that the logical block address corresponds to the selected block within the particular memory device.

In some examples, after receiving the unit of data from host device 4, write module 24 may utilize volatile memory 12 to temporarily store the unit of data prior to causing one or more of memory devices 16 to actually store the data. In some examples, write module 24 may be configured to send host device 4 a message indicating whether the data was successfully stored. However, in some examples, write module 24 may send the message to host device 4 confirming successful storage of the data before the data is actually stored. For instance, write module 24 may send the message to host device 4 confirming successful storage of the data when the data is stored in volatile memory 12.

In some examples, in addition to causing the data to be stored by memory devices 16, write module 24 may cause memory devices 16 to store information which may be used to recover the unit of data should one or more of the blocks fail or become corrupted. The parity information may be used to recover the data stored by other blocks. In some examples, the parity information may be an XOR of the data stored by the other blocks.

In order to write a bit with a logical value of 0 (charged) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 8 may cause an entire block to be erased. This may lead to write amplification, which refers to the ratio between the amount of data received from host device 4 to be written to memory devices 16 and the amount of data actually written to memory devices 16. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in changes to the flash memory cells. Eventually, the flash memory cells may become unusable due to this wear where the flash memory cells may be unable to store data with sufficient accuracy to permit the data to be retrieved.

One technique that controller 8 may implement to reduce write amplification and wear of flash memory cells includes writing data received from host device 4 to unused blocks or partially used blocks. For example, if host device 4 sends data to storage device 6 that includes only a small change from data already stored by storage device 6. The controller then may mark the old data as stale or no longer valid. Over time, this may reduce a number of erase operations blocks are exposed to, compared to erasing the block that holds the old data and writing the updated data to the same block.

Responsive to receiving a write command from host device 4, write module 24 may determine at which physical locations (e.g., blocks) of memory devices 16 to write the data. For example, write module 24 may request from address translation module 22 or maintenance module 26 one or more physical block addresses that are empty (e.g., store no data), partially empty (e.g., only some pages of the block store data), or store at least some invalid (or stale) data. Upon receiving the one or more physical block addresses, write module 24 may select one or more block as discussed above, and communicate a message that causes channel controllers 32A-32N (collectively, "channel controllers 32") to write the data to the selected blocks.

Read module 28 similarly may control reading of data from memory devices 16. For example, read module 28 may receive a message from host device 4 requesting data with an associated logical block address. Address translation module 22 may convert the logical block address to a physical block address using the flash translation layer or table. Read module 28 then may control one or more of channel controllers 32 to retrieve the data from the physical block addresses. Similar to write module 24, read module 28 may select one or more blocks and communicate a message to that causes channel controllers 32 to read the data from the selected blocks.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of write module 24, read module 28, and/or maintenance module 26.

Maintenance module 26 may be configured to perform operations related to maintaining performance and extending the useful life of storage device 6 (e.g., memory devices 16). For example, maintenance module 26 may implement at least one of wear leveling or garbage collection.

As described above, erasing flash memory cells may use relatively high voltages, which, over a plurality of erase operations, may cause changes to the flash memory cells. After a certain number of erase operations, flash memory cells may degrade to the extent that data no longer may be written to the flash memory cells, and a block including those cells may be retired (no longer used by controller 8 to store data). To increase the amount of data that may be written to memory devices 16 before blocks are worn and retired, maintenance module 26 may implement wear leveling.

In wear leveling, maintenance module 26 may track a number of erases of or writes to a block or a group of blocks, for each block or group of blocks. Maintenance module 26 may cause incoming data from host device 4 to be written to a block or group of blocks that has undergone relatively fewer writes or erases, to attempt to maintain the number of writes or erases for each block or group of blocks approximately equal. This may cause each block of memory devices 16 to wear out at approximately the same rate, and may increase the useful lifetime of storage device 6.

Although this may reduce write amplification and wear of flash memory cells by reducing a number of erases and writing data to different blocks, this also may lead to blocks including some valid (fresh) data and some invalid (stale) data. To overcome this fresh data/stale data state, maintenance module 26 may implement garbage collection. In a garbage collection operation, maintenance module 26 may analyze the contents of the blocks of memory devices 16 to determine a block that contain a high percentage of invalid (stale) data. Maintenance module 26 then may rewrite the valid data from the block to a different block, and then erase the block. This may reduce an amount of invalid (stale) data stored by memory devices 16 and increase a number of free blocks, but also may increase write amplification and wear of memory devices 16.

However, maintenance module 26 may not be configured to perform wear leveling or garbage collection within system area 20. While maintenance module 26 may be capable of being configured to implement wear leveling and garbage collection within system area 20, implementing such techniques may reduce the speed at which updated firmware may be applied to storage device 6 such that the storage device 6 may no longer meet customer requirements. Moreover, system area 20 may not include sufficient memory to support wear leveling that is used in data area 19, which has much larger overprovisioning than system area 20. Accordingly, system area 20 may not gain the benefits of wear leveling or garbage collection, which may result in at least some memory devices 16 included in system area 20 wearing after fewer write-erase cycles as compared the memory devices 16 included in data area 19.

In order to increase the life span of memory device 16 of system area 20, firmware management module 30 of controller 8 may be configured to perform the firmware management techniques described herein. For example, firmware management module 30 may receive identifying information for a particular firmware version (i.e., an indication of the particular firmware version) and a copy of the partiuclar firmware version that is to be loaded onto storage device 6 and executed by controller 8. The identifying information may include one or more of a firmware version identifier (i.e., a firmware level), a firmware build timestamp, or a firmware signature. The firmware signature may be a cryptographic signature, such as a cryptographic hash of the particular firmware that was used to generate the signature. One example cryptographic algorithm that may be used to generate the cryptographic signature is secure hash algorithm (SHA), such as SHA-256.

Firmware management module 30 may compare the identifying information to information stored by storage device 6. For example, firmware management module 30 may maintain a table including firmware version information for each version of firmware that is stored within system area 20. This table may be referred to herein as a "firmware release look-up table." The firmware release look-up table may be fully or partially stored within any of volatile memory 12, data area 19, system area 20, or any combination thereof. The firmware release look-up table may include any number of rows or columns and may be configured to store an index, a firmware version identifier (i.e., a firmware level), a firmware build timestamp, a firmware download timestamp, a firmware signature, and/or any other information.

Responsive to firmware management module 30 determining that the particular firmware version specified by the identifying information is not stored within system area 20 (i.e., because there is no corresponding entry within the firmware release look-up table), firmware management module 30 may insert an entry into the firmware release look-up table for the particular firmware version and store the particular firmware within system area 20. In some examples, firmware management module 30 also updates an active firmware index such that the active firmware index identifies the particular firmware version that is currently designated as the active firmware version. In various instances, storage device 6 may be powered off. When storage device 6 is powered back on, firmware management module 30 may determine the value of the active firmware index (e.g., by loading the value of the active firmware index from system area 20 or another memory of storage device 6) and load the particular version of the firmware that corresponds to the active firmware index.

Firmware management module 30 also may determine whether system area 20 includes sufficient free space to store the particular firmware version. In some examples, the portion of system area 20 reserved for storing various firmware versions may be at capacity and firmware management module 30 may not be able to store the particular firmware version within system area 20 without first removing a firmware version that is currently stored within system area 20. System area 20 may be configured to store any number of different versions of firmware for storage device 6, such as two, eight, thirty, etc. In examples where a previously stored firmware version needs to be removed prior to storing the particular firmware, firmware management module 30 may apply any cache management algorithm, such as least recently used (LRU), most recently used (MRU), random replacement (RR), etc. to select the previously stored firmware version to be removed.

Firmware management module 30 may identify the location at which each firmware version is stored within system area 20 based on an offset associated with each firmware version. The offset may correspond to a number of bits, bytes, blocks, or other unit of measurement at which each respective firmware version is located relative to a starting position. The offset may identify the starting location within memory device 16 at which each respective firmware version is located. Write module 24 and read module 28 may each use the offset when writing a firmware to system area 20 and/or reading a firmware from system area 20.

Firmware management module 30 may cause write module 24 to remove the identified previously stored firmware version from system area 20 and to store the particular firmware within system area 20. In addition, firmware management module 30 may update the firmware release look-up table to remove the entry for the firmware version that was removed and to insert an entry for the particular firmware version that was stored.

In examples in which firmware management module 30 determines that the particular firmware version specified by the identifying information is already stored within system area 20, firmware management module 30 may update a firmware download timestamp entry within firmware release look-up table for the particular firmware version. In these examples, the firmware download timestamp field of firmware release look-up table may indicate the last time at which each particular version of the firmware was loaded as the active firmware for storage device 6.

Regardless of whether the particular version of the firmware was previously stored within system area 20, firmware management module 30 may update the active firmware index, cause read module 28 to read the firmware from system area 20, and cause controller 8 to execute the particular version of the firmware as the active firmware. Controller 8 may perform the techniques described herein while the drive is online (i.e., while also performing various other read and write functions). That is, techniques of this disclosure may not require storage device 6 to transition to an "offline" mode in order to activate the desired firmware version.

Figure 3:
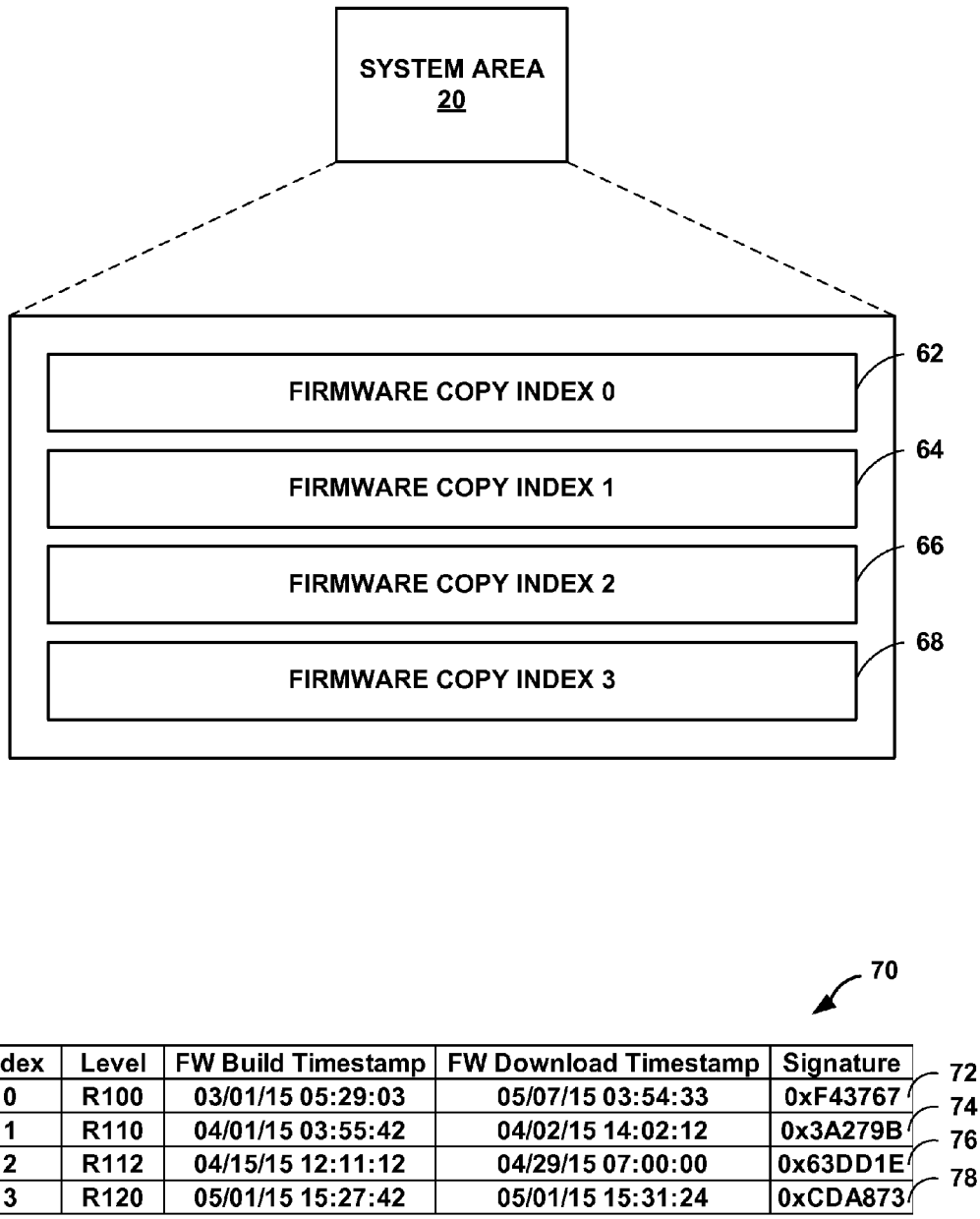
FIG. 3 is a block diagram illustrating a system area of the non-volatile memory array of FIG. 1 in more detail and an example firmware release lookup table, in accordance with one or more techniques of this disclosure.

FIG. 3 is a block diagram illustrating system area 20 of FIG. 1 in more detail and an example firmware release lookup table 70, in accordance with one or more techniques of this disclosure. As shown in the example of FIG. 3, system area 20 is configured to store four different firmware versions (firmware versions 62, 64, 66, and 68). Firmware release look-up table 70 is illustrated with four firmware records 72, 74, 76, 78, each of which corresponds to one of firmware versions 62, 64, 66, and 68. While shown as only storing four different firmware versions, system area 20 may store any number of different firmware versions as well as additional information, such as an indication of defective cells within NVMA 10.

When an initial firmware is loaded onto storage device 6, firmware management module 30 may cause write module 24 to store the initial firmware version as firmware version 62 and may insert an intial entry (e.g., firmware record 72) within firmware release look-up table 70. As each subsequent firmware version is loaded onto storage device 6, firmware management module 30 may store the respective additional firmware versions as firmware versions 64, 66, and 68 and may insert addition firmware records 74, 76, and 78 into firmware release look-up table 70.

As shown in FIG. 3, firmware release look-up table 70 includes four columns: index, level (i.e., firmware level or firmware version), firmware build timestamp, firmware download timestamp, and signature. Each row of firmware release look-up table 70 includes example values and data formats, but any value and any format may be used to store the information described herein. The index may be any value that uniquely identifies each row within firmware release look-up table 70. The index may also be used to identify the particular version of the firmware that is set as the active firmware. That is, when firmware management module 30 updates the active firmware index, firmware management module 30 may set the active firmware index to the value of the table index that corresponds to the currently active firmware version. Level may be a version identifier for each particular version of firmware stored in system area 20. The firmware build timestamp, in some examples, may be the release date and time for the particular firmware version. The firmware download timestamp may be the date and time at which the particulare firmware version was most recently loaded as the active firmware of storage device 6. Signature may be a unique value, such as a cryptographic hash, that can be used to uniquely identify the particular firmware version as well as to verify the contents of a the particular firmware. While shown as a simply three-byte value for purposes of illsutration, the signature may be any length, such as 128 bits or 256 bits. In various instances, firmware release look-up table 70 may include additional columns, such as an offset for the storage location of the respective firmware version within system area 20.

In some examples, responsive to receiving a firmware for storage within system area 20, firmware management module 30 may apply a hash function to generate the signature for the downloaded firmware and compare the signature to a signature included in the firmware information received from host 4. If firmware management module 30 determines that the signatures do not match, firmware management module 30 may not store the firmware within system area 20.

Firmware management module 30 may also use the signature to identify each particular firmware that is stored within system area 20. For example, when firmware management module 30 receives the firmware information from host 4, the firmware information may include a signature for the firmware host 4 is attempting to load as the active firmware. Firmware management module 30 may compare the signature provided by host 4 to the signatures stored within firmware release look-up table 70 in order to determine whether the particular version of the firmware is already stored within system area 20.

Figure 4:
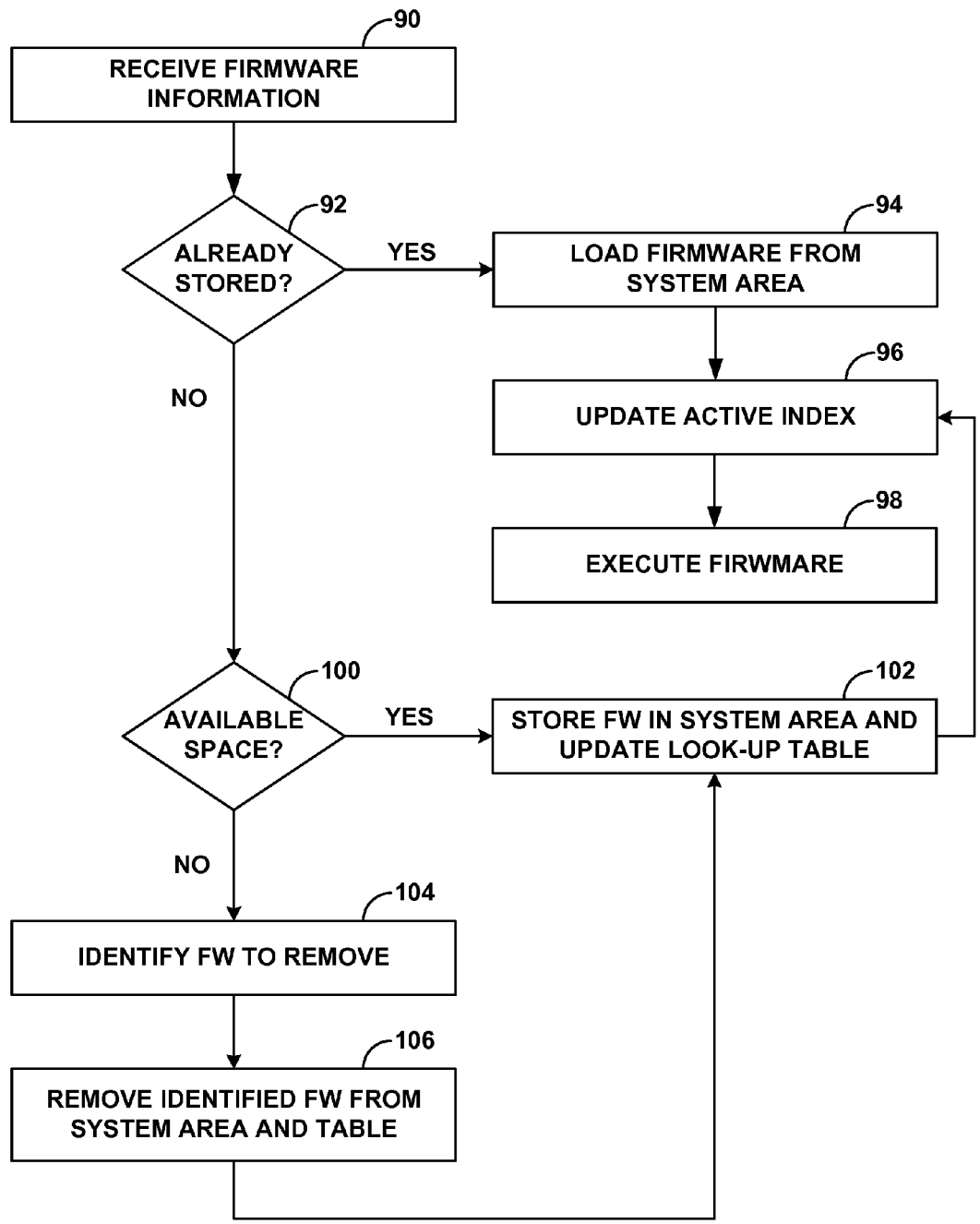
FIG. 4 is a flowchart illustrating example operation of a storage device in performing the firmware management techniques described in this disclosure.

FIG. 4 is a flowchart illustrating exemplary operation of a storage device in performing the firmware management techniques described in this disclosure. For purposes of illustration, the exemplary operation illustrated in FIG. 4 will be described with respect to storage device 6 of FIG. 1, controller 8 of FIG. 2, and system area 20 and firmware release look-up table 70 of FIG. 3, but the techniques may be used with any combination of hardware or software.

Host 4 may provide storage device 6 with information for a particular firmware version to be installed on storage device 6. Controller 8 may receive the particular firwware from host 4 (90). In some examples, the firmware includes firmware information, such as a signature of the firmware, a firmware level (i.e., version), and/or a firmware build timestamp, as well as the firware software itself. Firmware management module 30 may compare one or more portions of the firmware information to information stored within firmware release look-up table 70 and determine whether the particular firmware version was previously downloaded and is currently stored within system area 20 of storage device 6 (92). For example, firmware management module 30 may compare one or more of a signature of the particular firmware version, a firmware level, or a firmware build timestamp to entries in firmware release look-up table 70. If a match is found within firmware release look-up table 70, firmware management module 30 determines that the particular firmware version is stored within system area 20 ("YES" branch of 92). If a match is not found, firmware management module 30 determines that the particular firmware version is not stored within system area 20 ("NO" branch of 92).

In examples where the particular firmware version is stored within system area 20 ("YES" branch of 92), firmware management module 30 may cause read module 28 to load the particular firmware version from system area 20 (94). In various instances, firmware management module 30 may provide read module 28 with the starting location of the particular firmware version within system area 20 and/or an offset usable by read module 28 to determine the starting location of the particular firmware version within system area 20. In addition, firmware management module 30 may update a firmware download timestamp entry within firmware release look-up table 70 for the particular firmware version. In these examples, the firmware download timestamp field of firmware release look-up table 70 may indicate the last time at which each particular version of the firmware was loaded as the active firmware for storage device 6. Controller 8 updates the active firmware index (96) and executes the particular firmware as the currently active firmware for controlling operation of storage device 6 (98). The active firmware index indicates which version of the firmware should be loaded following a power cycle of storage device 6.

In examples where the particular firmware version is not stored within system area 20 ("NO" branch of 92), firmware management module 30 may determine whether system area 20 has available space to store the particular firmware version (100). If firmware management module 30 determines that there is space within system area 20 to store the particular firmware version ("YES" branch of 100), firmware management module 30 may cause write module 24 to write the particular firmware version to system area 20, and update the firmware release look-up table 70 to include an entry for the particular firmware version (102). Further, controller 8 may update the active firmware index (96) and execute the particular firmware version (98).

If firmware management module 30 determines that there is not sufficient space within system area 20 to store the particular firmware version ("NO" branch of 100), firmware management module 30 may identify a currently stored firmware version to remove from system area 20 in order to space for the particular firmware version (104). Firmware management module 30 may identify the firmware version to remove using any caching algorithms as described above. When firmware management module 30 removes the identified firmware version, firmware management module 30 causes write module 24 to erase the portion of system area 20 at which the identified firmware version is stored and removes the entry of firmware release look-up table 70 corresponding to the identified firmware version (106).

Once the identified firmware version is removed from system area 20 (106), firmware management module 30 may store the particular firmware version within system area 20, and insert a row into firmware release look-up table 70 for the particular firmware version (102). Controller 8 may update the active firmware index (96) and execute the particular firmware version as the current firmware used for controlling operation of storage device 6 (98).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
receiving, by a controller of a storage device, information for a second version of a firmware for the storage device, wherein the controller is currently executing a first version of the firmware that is different from the second version of the firmware;
determining, by the controller and based on the information for the second version of the firmware, whether the second version of the firmware is already stored in a system area of the storage device;
responsive to determining that the second version of the firmware for the storage device is already stored in the system area, loading, by the controller, the second version of the firmware from the system area;
responsive to determining that the second version of the firmware for the storage device is not stored in the system area:
updating, by the controller, a firmware release lookup table to include an entry for the second version of the firmware;
determining, by the controller, a system area offset; and
storing, by the controller and based on the system area offset, the second version of the firmware in the system area;
updating, by the controller, an active firmware index to indicate that the second version of the firmware is an active version of the firmware; and
executing, by the controller, the second version of the firmware.

2. The method of claim 1, wherein determining whether the version of the second version of the firmware is already stored in the system area of the storage device comprises:
determining, by the controller, based on the information for the second version of the firmware, whether an indication of the second version of the firmware is stored in the firmware release look-up table.

3. The method of claim 2, wherein the firmware release lookup table is stored in the system area.

4. The method of claim 2, wherein the firmware release lookup table is stored in a data area of the storage device.

5. The method of claim 1, wherein storing the second version of the firmware in the system area comprises:
responsive to determining that a previously stored version of the firmware is to be removed prior to storing the second version of the firmware:
identifying, by the controller, a particular previously stored version of the firmware to remove;
updating, by the controller, a firmware release lookup table to remove an entry corresponding to the particular previously stored version of the firmware;
storing, by the controller, the second version of the firmware in the system area; and
updating, by the controller, the firmware release lookup table to include an entry for the second version of the firmware.

6. The method of claim 5, wherein identifying the particular previously stored version of the firmware to remove comprises identifying, based on at least one of a respective firmware download timestamp or a respective firmware build timestamp associated with each firmware version stored in the system area, the particular previously stored version of the firmware to remove.

7. The method of claim 5, wherein the firmware release lookup table includes one or more of an index, a firmware release version, a firmware build timestamp, a firmware download timestamp, or a firmware signature.

8. The method of claim 1, wherein loading, by the controller, the second version of the firmware from the system area comprises:
determining, by the controller and based on an entry in a firmware release lookup table using an active firmware index associated with the second version of the firmware, the system area offset for the second version of the firmware; and
loading, by the controller, based on the system area offset, the second version of the firmware from the system area.

9. A storage device comprising:
a memory; and
a controller configured to:
receive information for a second version of a firmware for the storage device, wherein the controller is currently executing a first version of the firmware that is different from the second version of the firmware,
determine, based on the information for the second version of the firmware, whether the second version of the firmware is already stored in a system area of the memory,
responsive to determining that the second version of the firmware for the storage device is already stored in the system area, load the second version of the firmware from the system area,
responsive to determining that the second version of the firmware for the storage device is not stored in the system area:
update a firmware release lookup table to include an entry for the second version of the firmware;
determine a system area offset; and
store, based on the system area offset, the second version of the firmware in the system area of the memory,
update an active firmware index to indicate that the second version of the firmware is an active version of the firmware, and
execute the second version of the firmware.

10. The storage device of claim 9, wherein the controller is configured to determine, based on the information for the second version of the firmware, whether an indication of the second version of the firmware is stored in the firmware release look-up table.

11. The storage device of claim 9, wherein the memory is configured to store the firmware release lookup table in the system area.

12. The storage device of claim 9, wherein the memory is configured to store the firmware release lookup table in a data area of the memory.

13. The storage device of claim 9, wherein controller is further configured to:

responsive to determining that a previously stored version of the firmware is to be removed prior to storing the second version of the firmware:
  identify a particular previously stored version of the firmware to remove;
  update a firmware release lookup table to remove an entry corresponding to the particular previously stored version of the firmware;
  store the second version of the firmware in the system area of the memory; and
  update the firmware release lookup table to include an entry for the second version of the firmware.

14. The storage device of claim 13, wherein the controller is further configured to identify, based on at least one of a respective firmware build timestamp or a respective firmware download timestamp associated with each firmware version stored in the system area, the particular previously stored version of the firmware to remove.

15. The storage device of claim 13, wherein the firmware release lookup table includes one or more of an index, a firmware release version, a firmware build timestamp, a firmware download timestamp, or a firmware signature.

16. The storage device of claim 9, wherein the controller is further configured to:
  determine, based on an entry in a firmware release lookup table using an active firmware index associated with the second version of the firmware, the system area offset for the second version of the firmware; and
  load, based on the system area offset, the second version of the firmware from the system area.

17. A non-transitory computer-readable storage medium having stored thereon instructions that, when executed, cause one or more processors of a storage device to:
  receive information for a second version of a firmware for the storage device, wherein the controller is currently executing a first version of the firmware that is different from the second version of the firmware;
  determine, based on the information for the second version of the firmware, whether the second version of the firmware is already stored in a system area of the storage device;
  responsive to determining that the second version of the firmware for the storage device is already stored in the system area, load the second version of the firmware from the system area;
  responsive to determining that the second version of the firmware for the storage device is not stored in the system area:
    update a firmware release lookup table to include an entry for the second version of the firmware;
    determine a system area offset; and
    store, based on the system area offset, the second version of the firmware in the system area of the memory, store the second version of the firmware in the system area;
  update an active firmware index to indicate that the second version of the firmware is an active version of the firmware; and
  execute the second version of the firmware.

18. A system comprising:
  means for receiving information for a second version of a firmware for a storage device, wherein the storage device is executing a first version of the firmware that is different from the second version of the firmware;
  means for determining, based on the information for the second version of the firmware, whether the second version of the firmware is already stored in a system area of the storage device;
  means for, responsive to determining that the second version of the firmware for the storage device is already stored in the system area, loading the second version of the firmware from the system area;
  means for, responsive to determining that the second version of the firmware for the storage device is not stored in the system area:
    updating, by the controller, a firmware release lookup table to include an entry for the second version of the firmware;
    determining, by the controller, a system area offset; and
    storing, by the controller and based on the system area offset, the second version of the firmware in the system area;
  means for updating an active firmware index to indicate that the second version of the firmware is an active version of the firmware; and
  means for executing the second version of the firmware.

* * * * *